United States Patent [19]

Angeleri et al.

[11] 3,708,625

[45] Jan. 2, 1973

[54] CIRCUIT ARRANGEMENT FOR UTILIZING IDLE CHANNELS OF MULTIPLEX TELECOMMUNICATION SYSTEM FOR DATA TRANSMISSION

[75] Inventors: Emanuele Angeleri; Mario Bonatti, both of Milan; Gianmario Costa, Cornaredo; Isidoro Poretti, Castiglione-Olona, all of Italy

[73] Assignee: Societa Italiana Telecommunicazioni Siemens S.p.A., Milan, Italy

[22] Filed: Feb. 1, 1971

[21] Appl. No.: 111,441

[30] Foreign Application Priority Data

Feb. 3, 1970 Italy ..............................20149 A/70

[52] U.S. Cl. ..............................................179/15 BY
[51] Int. Cl. ................................................H04j 5/00
[58] Field of Search .........179/15 BY, 15 AS; 178/50

[56] References Cited

UNITED STATES PATENTS

| | | | |
|---|---|---|---|
| 3,311,704 | 3/1967 | Filipowski | 179/15 BY |
| 3,310,631 | 3/1967 | Brown | 179/15 BY |
| 3,303,285 | 2/1967 | Brown | 179/15 BY |
| 3,564,144 | 2/1971 | Diggelmann | 179/15 BY |
| 2,957,946 | 10/1960 | Kolding | 179/15 AS |

*Primary Examiner*—Kathleen H. Claffy
*Assistant Examiner*—David L. Steward
*Attorney*—Karl F. Ross

[57] ABSTRACT

A multiplex telephone system with *n* signal channels interconnecting two terminals has a data transmitter at one terminal and a data receiver at the other terminal, these two data-processing units being connectable to each other by way of any channel not engaged in voice communication. A line monitor at each terminal determines the number of idle incoming and outgoing lines, respectively, and controls an associated logical selector to allocate one or more disengaged channels to data transmission, according to the number of idle lines, with the aid of a switching circuit connecting such channel directly to the data-transmitter output and the data-receiver input. The *n* channels are divided into *m* groups, not more than one disengaged channel per group being allocable at any given time to the transmission of data; such allocation is promptly canceled by the selector whenever additional requests from calling subscriber lines reduce the number of available channels below a predetermined minimum.

9 Claims, 3 Drawing Figures

INVENTORS:
Manuele Angeleri
Mario Bonatti
Gianmario Costa
Isidoro Poretti

INVENTORS:
Manuele Angeleri
Mario Bonatti
Gianmario Costa
Isidoro Poretti

Karl F. Ross Attorney

CIRCUIT ARRANGEMENT FOR UTILIZING IDLE CHANNELS OF MULTIPLEX TELECOMMUNICATION SYSTEM FOR DATA TRANSMISSION

Our present invention relates to a system for the transmission of stored information, hereinafter referred to as data, over a multiplex communication network designed primarily for the exchange of live messages, specifically telephone calls.

Existing facilities for data transmission, such as teleprinter circuits, are of limited reach and, in general, are designed only for low-speed traffic, well below the operating capacity of communication networks such as telephone systems designed to handle signals in the voice-frequency range. Switchable telephone circuits, including the usual central-office equipment such as line finders and selectors, are less favorable in this respect than direct point-to-point telephone channels, owing to the presence of switching transients and other noises which normally limit transmission speeds to about 1,200 bits per second; this rate can be increased to about 9,600 bits per second by transmission over a direct line.

The foregoing considerations strongly suggest the use of existing telephone networks for the exchange of digital information. Particularly in the case of multiplex systems (e.g., of the time-sharing type), with a channel capacity designed to handle peak-period traffic, facilities for the transmission of stored data are readily available during off-hours.

It is, therefore, the general object of our present invention to provide means for adapting a multichannel telecommunication system, especially a telephone network, to the transmission of data without materially impairing the ability of the system to handle its regular traffic.

A more particular object of our invention is to provide means for setting up a direct data-transmission path between two terminal stations with avoidance of their respective switching stages which normally serve to connect a calling subscriber line at one terminal to a called subscriber line at the other terminal by way of an available trunk channel extending between these terminals. The term "channel," as herein used, could include both radio links and metallic circuits.

In a telecommunication system embodying our invention, wherein two terminal stations are interconnected by $n$ signal channels serving a multiplicity of calling lines incoming at the first station and a multiplicity of called lines outgoing from the second station, a line monitor connected to the channels at the first station ascertains their state of engagement; if a certain number of channels are found to be free, the line monitor actuates a switching circuit at that station to connect a data transmitter to a disengaged channel while a detector at the second station responds to such seizure by actuating a similar switching circuit to connect a data receiver to the same channel. If, however, a request for the seized channel comes in from a calling subscriber line at either station, the line monitor at the first station and the detector at the second station immediately cause the channel to be released for engagement by the conventional terminal equipment.

In the usual telephone exchange, audio-frequency signals pass between the central office and a local subscriber by way of two so-called talking conductors or "a" and "b" wires, a third or "c" wire serving for exchange of direct-current switching signals. A line relay connected to the "c" wire of any incoming line responds to a grounding of that wire to indicate the initiation of a call by the respective subscriber; if the call is for a subscriber served by a remote terminal to which a channel is available, this channel is engaged for the transmission first of dial pulses and later of speech currents. At the remote terminal, another relay responds to the engagement and marks the channel "busy," as by grounding the local "c" wire. In a time-sharing multiplex system, in which the channels are respective time slots in a scanning cycle, the engagement of a channel (i.e., the temporary allocation of a particular time-slot to a calling subscriber line) may be communicated to the remote terminal by a special code at the beginning of each cycle. In any event, the multiplexers at both ends of the trunk line are synchronized and have the same information as to the engaged or disengaged conditions of each channel.

Thus, in a system according to our invention, the detector at the second terminal may be a substantial duplicate of the line monitor of the first terminal and, in an analogous manner, may be connected to the local "c" wires to determine the number of channels available at any given instant. In order to insure connection of the data transmitter and the data receiver to the same idle channel where several such channels are available, an advantageous feature of our invention resides in the provision of a selector at each terminal station establishing a predetermined preference pattern for the seizure and release of a channel by the associated switching circuits. In order to enable the simultaneous seizure of more than one channel for data transmission, we divide the $n$ channels into $m$ groups, each with its own order of precedence, and provide definite criteria for the selection of these groups. Thus, only the first of these groups may be activated if the number of available channels falls between two predetermined limits; another group may be added if that number exceeds the higher of these limits but is less than a third limit, and so forth. With the aid of identical threshold sensors at the two terminals, the determination of the selected group or groups and of the single channel utilized in each group will be unequivocal. (In a less elaborate system, in which only one channel is used for data transmission whenever a certain minimum number of channels are disengaged, the selected channel could also be identified at the receiving terminal with the aid of a decoder responsive to the appearance of binary signals on the local "a" and "b" wires.)

With a grouping of the channels as just described, the number of channels simultaneously in use for data transmission may vary between O and $m$, depending on the density of telephone traffic. Since the number of channels allocated to data transmission is always a small fraction of the total number of channels not engaged in telephone communication, a request from a calling line (which has priority over the exchange of data) may be immediately satisfied without switching any given channel from one type of service to the other. It is thus possible to maintain a certain continuity of data transmission by applying a simulated busy signal to the "c" wire of the local extension of any channel so utilized, thereby preventing an immediate switchover to telephone service, this simulated signal being of such a nature as not to affect the count of disengaged channels by the threshold circuit. As more lines are preempted for telephone communication, however, the number of available groups dwindles with corresponding reduction in the number of data-transmitting channels; if the telephone traffic approaches the full capacity of the system, all digital transmission is cut off.

Since, normally, each channel has both an incoming and an outgoing branch, two-way data transmission may be carried out over any available channel.

The invention will be described in greater detail hereinafter with reference to the accompanying drawing in which.

Figure 1:
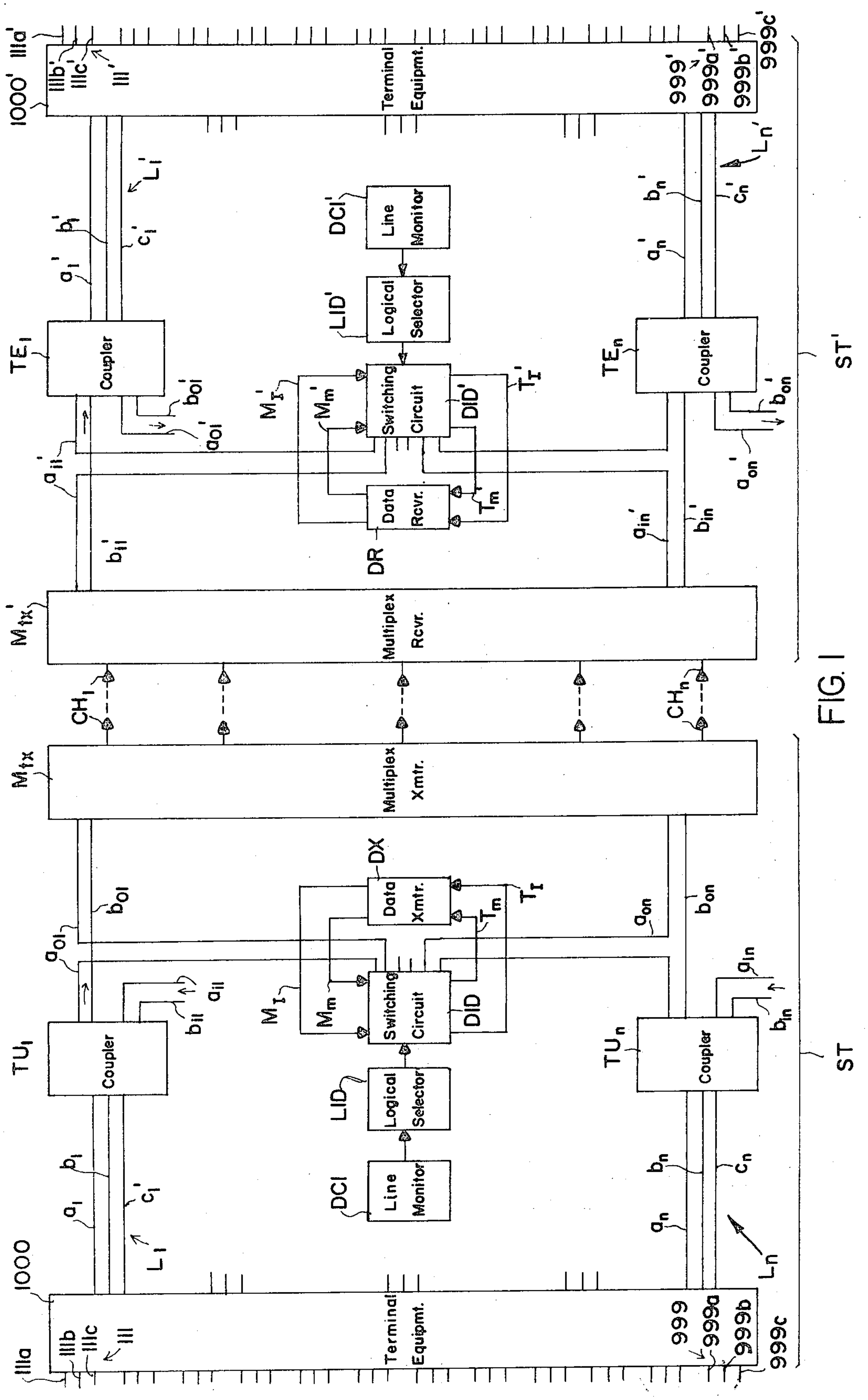
FIG. 1 is an overall block diagram of a multiplex telecommunication system equipped for data transmission in accordance with our invention.

The system shown in FIG. 1 comprises a first terminal station ST and a second terminal station ST' interconnected by a trunk with *n* channels designated $CH_1 - CH_n$. These channels, as indicated above, are representatives of different metallic conductors, carrier frequencies or time slots. Although each station has both transmitting and receiving facilities, only the transmitting sections of station ST and the receiving sections of station ST' have been illustrated, it being understood that the omitted sections are substantially the duplicates of those shown.

Station ST serves a multiplicity of subscriber lines, two of which have been particularly indicated at 111 and 999. Line 111 comprises a pair of talking conductors 111*a*, 111*b* and a signal wire 111*c*; corresponding wires of line 999 have been designated 999*a*, 999*b* and 999*c*. A block 1000 includes the usual terminal equipment, such as line finders and selectors, serving for the temporary connection of any of these subscriber lines to one of *n* local lines $L_1 - L_n$; each of these local lines also has three wires $a_1, b_1, c_1 \ldots a_n, b_n, c_n$, engagement of any of these local lines by an incoming subscriber line resulting in the grounding of the corresponding "c" wire. Lines $L_1 - L_n$ are, in effect, local extensions of channels $CH_1 - CH_n$, respectively, to which their talking conductors are connected via respective couplers $TU_1 - TU_n$ of the hybrid-coil type from which outgoing leads $a_{01}, b_{01} \ldots a_{0n}, b_{0n}$ and incoming leads $a_{i1}, b_{i1} \ldots a_{in}, b_{in}$ extend to a multiplex transmitter Mtx and a corresponding receiver, not shown, giving access to the outgoing and incoming branches of the respective channels.

A line monitor BCI has input connections to all signal wires $c_1 - c_n$ and controls a logical selector LID which in turn actuates a switching circuit DID with *m* ($m < n$) output leads $T_1 - T_m$ leading to a data transmitter DX. A like number of leads $M_1 - M_m$ extend from this transmitter back to switching circuit DID. Local wires $a_{01} - a_{0n}$ are led through circuit DID which normally maintains their continuity but may connect them across an output of data transmitter DX under the control of selector LID as more fully described hereinafter.

Data transmitter DX has a counterpart at station ST' in the form of a data receiver DR; the counterparts of couplers $TU_1 - TU_n$ at the latter station have been designated $TE_1 - TE_n$. Otherwise, each of the described components of station ST has a counterpart in station ST designated by the same reference character with the addition of a prime mark.

Line monitor DCI determines, from the potentials of wires $c_1 - c_n$, how many local lines $L_1 - L_n$ and therefore channels $CH_1 - CH_n$ are available at any time, i.e., are not engaged by any subscriber line 111 – 999. Line monitor DCI' at station ST' makes the same determination from the potentials of wires $c_1 - c_n$, which, as described above, are in the same state of energization as their counterparts at station ST. If the number of available channels exceeds a critical value, which conveniently may be on the order of *m*, selectors LID and LID' are triggered into operating the switching circuits DID and DID' according to a predetermined preference pattern so that a maximum number of *m* channels, among a considerably larger number of idle channels, are seized for the transmission of stored data over corresponding outgoing leads $a_{01} - a_{0n}$. At the remote station ST', the incoming leads $a_{i1'} - a_{in'}$ of the same channels are concurrently connected by switching circuit DID' to data receiver DR. Simultaneously, a data transmitter at station ST' may communicate with a data receiver at station ST by way of oppositely transmitting branches of the selected channels; this connection may be established under the control of line monitor DCI' or, alternately, under that of line monitor DCI concurrently with the switching of transmitter DX and receiver DR. Availability of up to *m* channels greatly speeds up data transmission during periods of reduced telephone traffic.

In the specific embodiment here envisaged, and more fully described hereinafter with reference to FIGS. 2 and 3, the number *n* of channels is 45 for each direction of transmission; they are divided into five groups ($m = 5$) of nine channels each, the concurrent idleness of at least five channels stimulating the line monitor DCI into allocating one or more of these channels to data transmission.

Units DID, LID and DCI are divided into as many identical sections as there are groups; FIG. 2 shows elements of these units associated with the first, the second and the ninth channel of the first and the fifth group. The couplers $TU_1$, $TU_2$, $TU_9$, $TU_{37}$, $TU_{38}$, $TU_{45}$ of local lines $L_1$, $L_2$, $L_9$, $L_{37}$, $L_{38}$, $L_{45}$, diagramatically illustrated in FIG. 2 as simple transformers, have been included for convenience in the corresponding sections of switching circuits DID. It will suffice to describe in detail only the components associated with the first group of lines $L_1 - L_9$, corresponding components of group $L_{37} - L_{45}$ having been designated by analogous reference characters with appropriate subscripts.

Coupler $TU_1$ transmits the speech currents from wires $a_1$, $b_1$ of line $L_1$ to leads $a_{01}$, $b_{01}$ by way of back contacts and armatures of a normally de-energized relay $H_1$ whose operating circuit is in series with an NPN transistor $K_1$. Another armature and back contact of this relay normally connects wire $c_1$ to the base of another NPN transistor $Q_1$ while also completing a connection between this wire and positive potential (e.g., of 12 V) on a bus bar $B_1$. With wire $c_1$ ungrounded, i.e., with line $L_1$ disengaged, transistor $Q_1$ conducts and effectively grounds its collector, which is connected to bus bar $B_1$ through a resistor $R_1$, this collector being also connected via a diode $E_1$ to a conductor F which is grounded through a resistor R and is multipled to the collectors of all other transistors $Q_2$ – $Q_{45}$ through respective diodes $E_2$ – $E_{45}$. Thus, the potential of conductor F is near zero when all 45 transistors conduct, i.e., when all channels are free, but rises progressively as the number of available channels decreases. This potential is applied to one input of a threshold sensor $S_1$ (shown as an inverting amplifier) in the first section of line monitor DCI and, in parallel therewith, to corresponding sensors in all other sections including an amplifier $S_V$ in the fifth and last section. The output of the inverting amplifier $S_I$ has the logical value "1" until the potential of conductor F reaches a relatively high value, indicative of less than five disengaged lines, as determined by the position of a tap on a potentiometer $V_I$ connected to its other input. The other four amplifiers are similarly biased to produce a corresponding output as long as the conductor potential stays below progressively reduced limits indicative of a minimum of six, seven, eight or nine available channels, respectively.

Sensor $S_I$, when conducting, energizes one input of each of nine associated AND gates $A_1$, $A_2$ ... $A_9$ forming part of a preference circuit within the group. AND gate $A_1$ has an additional input connected through a resistor $Z_1$ to the back contact of relay $H_1$ normally joined to wire $c_1$; this AND gate is therefore conductive if line $L_1$ is free, yet resistor $Z_1$ is also connected through an inverter $I_1$ to respective inputs of all the other AND gates of the group which therefore remain blocked under these circumstances. If line $L_1$ is engaged but line $L_2$ is not, AND gate $A_2$ conducts since its third input receives positive voltage from the associated resistor $Z_2$. The last AND gate $A_9$ of the group conducts only if all the preceding eight lines are busy and line $L_9$ is disengaged.

The conducting AND gate causes saturation of the associated transistor $K_1$ – $K_9$ so that the corresponding relay $H_1$ – $H_9$ operates and reverses its armatures. This action grounds the wire $b_{o1}$ – $b_{o9}$ and connects the companion wire $a_{o1}$ – $a_{o9}$ to an output lead $M_1$ of data transmitter DX through a respective isolating diode $D_1$ – $D_9$; at the same time an OR gate $O_I$, with nine inputs each connected to the output of a respective AND gate $A_1$ – $A_9$, also conducts to energize the input lead $I_I$ of transmitter DX to direct this transmitter to send out its stored data via lead $M_I$. If enough lines are available to actuate also the sensor $S_V$, one of lines $L_{37}$ – $L_{45}$ could be similarly seized for data transmission.

The operated relay (e.g., $H_1$) of each group grounds the associated "c" wire to simulate a busy line; since this action disconnects that wire from the corresponding resistor $Z_1$ – $Z_{45}$, the associated transistor $Q_1$ – $Q_{45}$ remains saturated so that the count of available lines as measured by the sensors $S_I$ – $S_V$ is not changed. This count changes only if other lines, not assigned to the data transmitter, are made busy or become idle; if, for example, relays $H_1$ and $H_{37}$ are operated in the presence of nine disengaged lines, a pre-emption of any of these lines (other than lines $L_1$ and $L_{37}$) by the telephone exchange releases the relay $H_{37}$ but keeps the relay $H_1$ operated until the count drops to less than five.

It will be apparent that the existence of five or more free lines does not necessarily mean that one of these lines is in the first group, so that there is no certainty that a channel will be assigned to data transmission under these conditions; similarly, it is not certain that all five outputs of data transmitter DX will be utilized even if the number of free channels is large, yet the probability is high that one or more channels will transmit data if five or more channels are not engaged in telephone service. Naturally, the several threshold sensors $S_I$ – $S_V$ could be arranged to respond to different counts, e.g., of six, eight, 10, 12 or 14 lines, respectively; in fact, this response may be adjusted with the aid of potentiometers $V_I$ – $V_V$.

Figure 2:
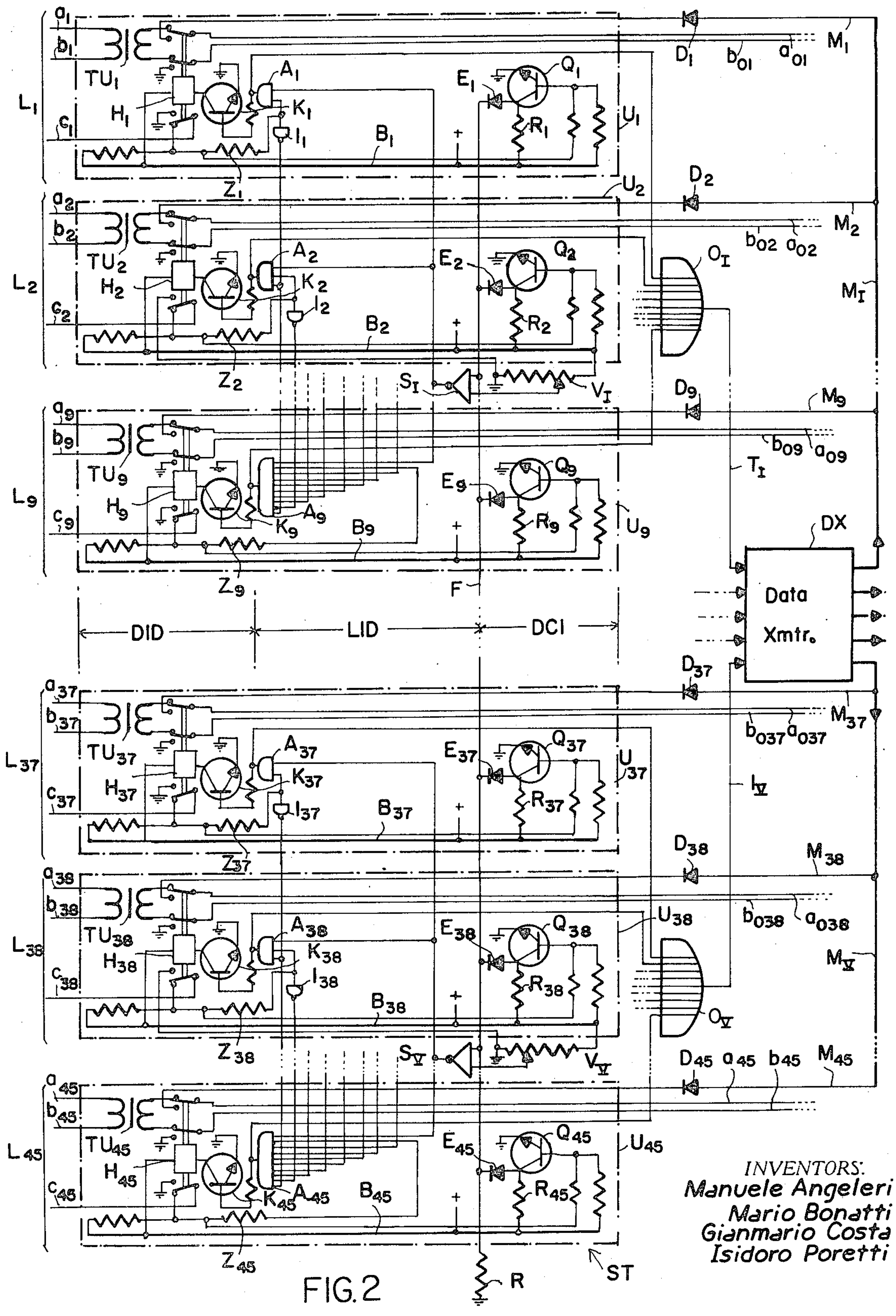
FIG. 2 is a more detailed circuit diagram of a transmitting station forming part of the system of FIG. 1.
Figure 3:
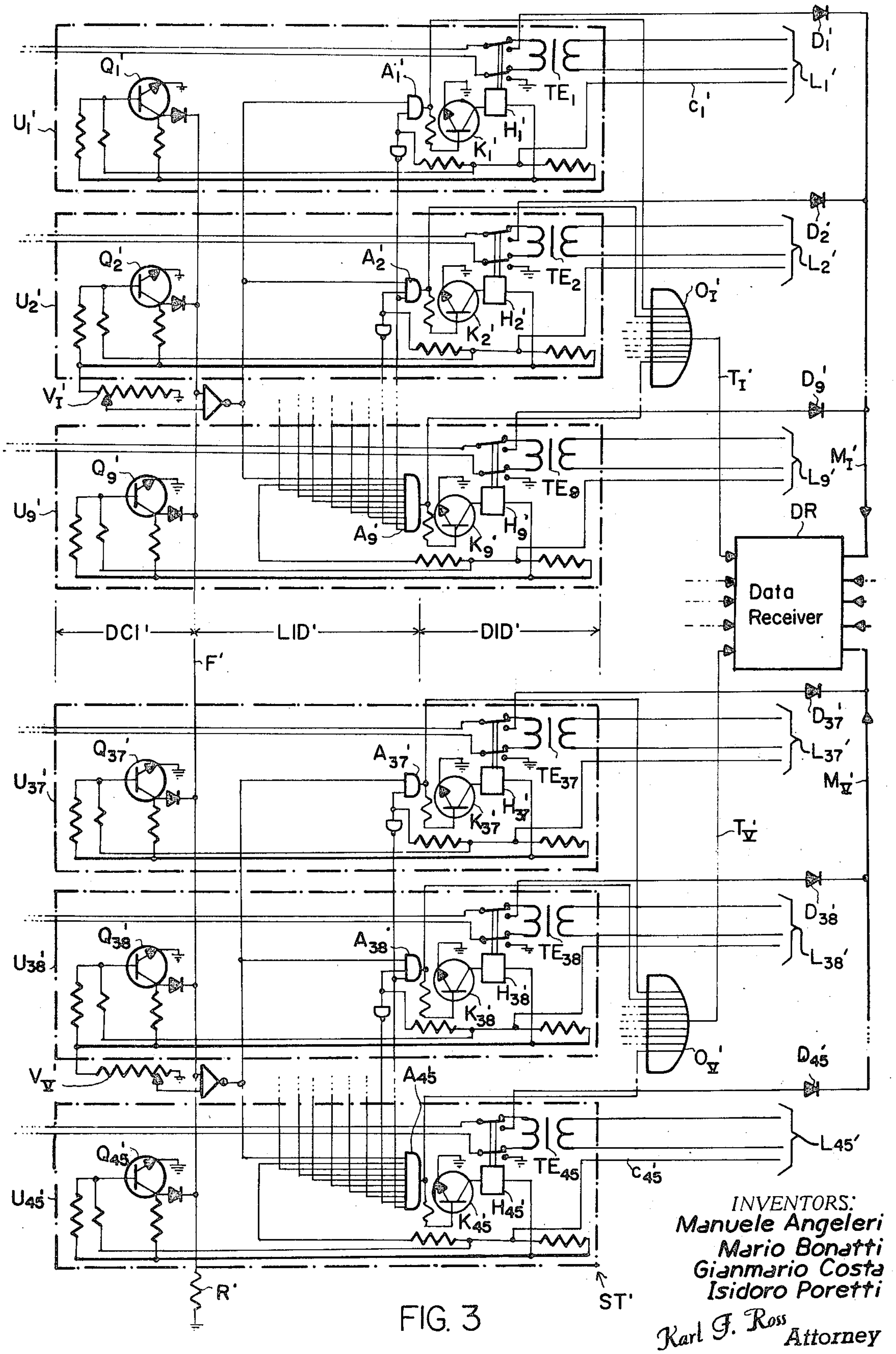
FIG. 3 is a similar circuit diagram of an associated receiving station.

The equipment of receiving station ST' shown in FIG. 3 is substantially identical with that shown in FIG. 2, except that the lower armatures and back contacts of relays $H_1'$ – $H_{45}'$ have been omitted inasmuch as there is no need to apply a simulated busy signal to the associated signal wires $c_1'$ – $c_{45}'$ which therefore have been connected directly to resistors $Z_1'$ – $Z_{45}'$. Also, the polarity of diodes $D_1'$ – $D_{45}'$ has been reversed, with reference to diodes $D_1$ – $D_{45}$ of station ST, in order to channel incoming data to the inputs $M_I'$ – $M_V'$ of data receiver DR. Threshold potentiometers $V_I'$ – $V_V'$ are, of course, set to the same values as their counterparts $V_I$ – $V_V$ at the transmitting end. The operation of line monitor or detector DCI', selector LID' and switching unit DID' being thus analogous to that of circuits DCI, LID and DID in FIG. 2, no further description is considered necessary.

We claim:

1. In a telecommunication system including a first and a second station interconnected by $n$ signal channels, a multiplicity of calling lines incoming at said first station, a multiplicity of called lines outgoing from said second station, and terminal equipment at said stations for temporarily engaging any of said channels to establish communication between a calling line and a called line, the combination therewith of:

a source of stored information, transmittable over any of said channels, at said first station;

a receiver for said stored information at said second station;

monitoring means connected to said channels at said first station for ascertaining their state of engagement;

first switching means at said first station for seizing a disengaged channel and connecting said source thereto under the control of said monitoring means;

detector means connected to said channels at said second station for ascertaining the availability of any channel for seizure by said first switching means;

and second switching means at said second station for extending a channel available for such seizure to said receiver under the control of said detector means, said monitoring means being responsive to requests for a seized channel from a calling line for releasing such channel and making same unavailable for transmission of said stored information;

said monitoring means comprising a threshold circuit multipled across said channels for determining the number of disengaged channels and for actuating said first switching means upon said number exceeding a predetermined critical value.

2. The combination defined in claim 1, further comprising a first selector at said first station responsive to said threshold circuit for actuating said first switching means to seize one of several available channels in a predetermined preference pattern, said detector means including another threshold circuit analogous to that of said monitoring means and a second selector responsive to said other threshold circuit for actuating said second switching means at said second station in the preference pattern of said first switching means at said first station.

3. The combination defined in claim 2 wherein said $n$ channels are divided into $m$ groups, each threshold circuit including $m$ sensors responsive to different numbers of disengaged channels exceeding respective critical values, each selector comprising logical circuitry establishing an individual order of precedence in each group for the seizure of not more than one channel thereof under the control of an individual sensor respectively assigned to each group.

4. The combination defined in claim 3 wherein said logical circuitry includes a set of AND gates and at least one OR gate connected to the outputs of said AND gates.

5. The combination defined in claim 3 wherein the lowest of said critical values is substantially equal to $m$.

6. The combination defined in claim 2 wherein each of said channels is provided with a local extension at said first station including a pair of talking conductors and a signaling wire receiving a busy signal upon connection thereof to a calling line, said monitoring means being connected to all said signaling wires.

7. The combination defined in claim 6 wherein said first switching means includes a set of $m$ relays, one for each channel, with operating circuits connected to the signaling wires of the respective channels for preventing the seizure of a channel in the presence of a busy signal identifying such channel as engaged by a calling line.

8. The combination defined in claim 7 wherein each of said relays is provided with contacts for applying a simulated busy signal to the signaling wire of its channel while disconnecting such signaling wire from said monitoring means and from its own operating circuit to render the simulated busy signal ineffectual in controlling channel seizure.

9. The combination defined in claim 6 wherein each of said channels is provided with another local extension at said second station including a pair of talking conductors and a second signaling wire receiving a busy signal upon connection thereof to a called line, said detector means being connected to all said second signaling wires.

* * * * *